Figure 1:
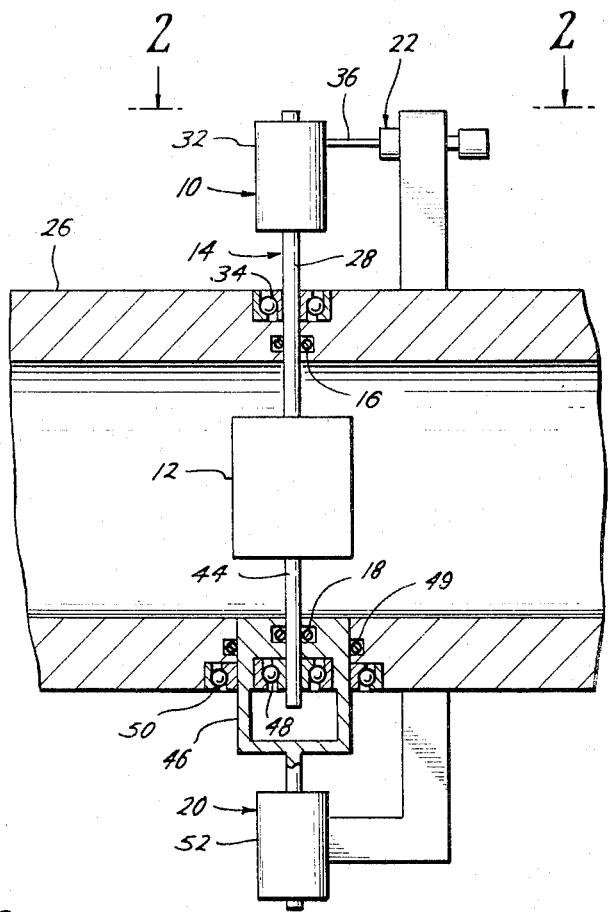

Dec. 6, 1966   W. B. BANKS   3,289,466
APPARATUS FOR MEASURING VISCOSITY
Filed June 23, 1964

William B. Banks
INVENTOR.

BY James F. Weiler
Jefferson D. Giller
William T. Stout
Paul L. DeVerter II
ATTORNEYS United States Patent Office 3,289,466
Patented Dec. 6, 1966

3,289,466
APPARATUS FOR MEASURING VISCOSITY
William B. Banks, Houston, Tex., assignor to Automation Products Inc., Houston, Tex., a corporation of Texas
Filed June 23, 1964, Ser. No. 377,330
3 Claims. (Cl. 73—59)

The present invention relates to an apparatus for measuring viscosity, and more particularly, relates to apparatus for measuring viscosity of a fluid in a container by rotating a member through a seal.

While measuring viscosity by measuring the force reaction to a member driven in the fluid to be measured is old, it has not been possible in the past to obtain accurate viscosity measurements in a closed container because the measurement must be taken through a seal in the container. That is, the seal exerts a retarding force on the measuring linkage thereby preventing any accurate measurement of the shearing torque between the rotating member and the fluid being measured. Furthermore, while the effects of the seal on the measurement may be initially measured and taken into account on the viscosity measurements, this has not been satisfactory as the effect of the seal on the measurement linkage varies with operating conditions such as temperature, pressure, and wear.

Therefore, it is the general object of the present invention to provide an apparatus for measuring viscosity of a fluid in a container through a seal by rotating a member in the fluid wherein the effect of the seal on the viscosity measurement is compensated for accurately.

A still further object of the present invention is the provision of an apparatus for measuring viscosity of a fluid in a container through a seal by means of a rotating member wherein the effect of the seal on the viscosity measurement is continuously compensated for.

Still a further object of the present invention is the provision of an apparatus for measuring viscosity of a fluid in a container through a seal by a rotating member by rotatably driving said member through the seal, measuring the force required to drive the member, and applying a rotating force to the member substantially equal but opposite to the torque loss due to the seal whereby the force being measured is an indication only of the viscosity of the fluid in contact with the rotating member.

Yet a further object of the present invention is the provision of an apparatus for measuring viscosity of a fluid in a container through a seal by means of a rotating member by rotatably driving the member through a first seal at a constant speed, rotatably driving a second identical seal against the member in the same direction but at twice the speed thereby compensating for the torque loss in the first seal, and measuring the force required to drive the member which is an indication of only the viscosity of the fluid being measured.

Yet a further object of the present invention is the provision of an apparatus for measuring viscosity of a fluid in a container through a seal by a rotating member and compensating for the effect of the seal on the viscosity measurement by providing a rotatable member positioned in the container for contact with the fluid, a first rotatable rod connected to the member and extending through the container, a first seal means positioned about the container for sealing fluid flow from the container around said first rod, a first drive means positioned outside of the container for rotating the first rod and said member, measuring means measuring the torque applied to the first rod by the first drive means, a second rod connecting to the member and extending through said container, a second seal means substantially identical to the first seal and positioned about the second rod for sealing fluid flow from the container around the second rod, a rotatable carriage supporting said second seal means, and a second drive means positioned outside of the container and connected to the carriage for rotating the carriage and second seal means in the same diretcion as the member is rotated, but at twice the speed of rotation of said member thereby compensating for the torque loss through the first seal means.

Figure 2:
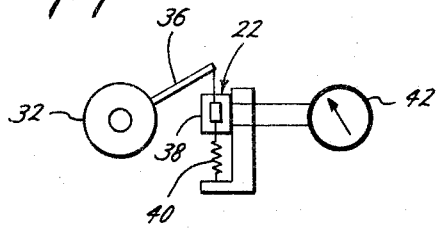

Other and further objects, features and advantages will be apparent from the following description of a presently preferred embodiment of the invention, given for the purpose of disclosure, and taken in conjunction with the accompanying drawings, where like character references designate like parts throughout the several views and where, FIGURE 1 is an elevational schematic, in cross-section, illustrating an apparatus according to the invention, and FIGURE 2 is a cross-sectional view taken along the line 2—2 of FIGURE 1.

Referring now to the drawings, and particularly to FIGURE 1, the reference numeral 10 generally designates the viscosity meter of the present invention and generally includes a rotating member 12, a first rotatable drive means 14 for rotating the member 12, a first seal 16, a second seal 18, a second rotatable drive means 20 for rotating the second seal 18, and a suitable measuring means 22 for measuring the force exerted by the first rotatable drive means 14.

The rotatable member 12 may be of any suitable shape, and is here shown as being of conventional cylindrical shape whereby fluid in the container 26 such as a pipeline may flow over and contact the external surface of the member 12. Thus, as is common in viscosity measurements, the member 12 is rotated relative to the fluid and the force reaction or shearing torque of the fluid relative to the surface of the member 12 as the member 12 is rotated is a measurement of the viscosity of the fluid present in the container 26.

In order to rotate the member 12 a rotatable shaft or rod 28 is provided connected to the member and extending through a conventional seal 16 in the wall of the container 26, and is in turn driven by constant speed motor 32 which by way of example only may be a synchronous motor. In addition, suitable bearings 34 may be provided around the shaft 28. Thus, the motor 32 may rotate the member 12 relative to the fluid in the container 26. And suitable measuring means 22 is provided, which by way of example only, may include a torque arm 36 connected to the housing of the motor 32 and also connected to a suitable potentiometer 38 and spring 40. Thus, assuming that the motor rotates in a direction to cause the motor housing and arm 36 to move in a counterclockwise direction, as best seen in FIGURE 2, against the action of the spring 40, the conventional potentiometer 38 is correspondingly moved to prove a read-out on a suitable meter 42. Thus, the amount of torque exerted by the motor 32 on the shaft 28 is indicated on the read-out meter 42.

However, while the torque indicated on the read-out meter 42 includes an indication of the shearing torque or force reaction of the member 12 to the fluid which is an indication of viscosity, the reading also includes the torque force applied by the seal 16 against the shaft 28. Furthermore; the force applied by the seal 16 to the rotating shaft 28 may vary with operating conditions such as pressure, temperature and use. Therefore, the read-out meter 42 does not provide an accurate measurement of only the shearing torque between the member 12 and the fluid so as to provide an accurate viscosity measurement.

Therefore, the present invention is directed to providing an apparatus for and a method of compensating for the torque friction loss caused by the seal 16 acting against the shaft 28. Thus, a second rotatable shaft or rod 44 is provided connected to the rotatable member 12 and which may extend outside out of the container 26. A second seal 18 is provided in contact with the rotatable shaft 44. It is to be noted that the seal 18 is identical to the seal 16 and is subjected to the same pressures and temperatures as the seal 16 is under its operating conditions. A rotatable carriage 46 is provided which carries and supports the seal 18 and includes conventional bearings 48. The carriage 46 may be suitably mounted in the contained 26 and may also include a suitable seal 49 and conventional bearings 50.

Of course, with the motor 32 driving the member 12 there wuold be a double friction loss due to each of the seals 16 and 18 as compared to a single seal. Therefore, a motor 52 is provided connected to the carriage 46 which rotates the carriage 46 at twice the speed of rotation of the rotatable member 12, but in the same direction. This provides a compensation aiding torque by the action of the rotating seal 18 to compensate for the retarding torque of the seal 16 whereby the torque measured by the measuring means 22 will depend solely upon the viscosity of the rotating member 12. That is, assume that the motor 32 is rotating in a clockwise direction at 100 revolutions per minute, the rod 28 and the rotatable member 12 and the rod 44 would also rotate in a clockwise direction at 100 revolutions per minute. However, the seal 16 since it is stationary would present a retarding torque force acting against the rod 28. However, the motor 52 would then be operated in the same counterclockwise direction but at a speed of 200 revolutions per minute. Thus, the seal 18 would be rotating faster than the rod 44 by 100 revolutions per minute, which is the same speed differential as between seal 16 and the rod 28. However, since the seal 18 is rotating faster than the rod 44 by 100 revolutions per minute, while rod 28 is rotating 100 revolutions per minute faster than seal 16, it is providing a force equal to but opposite to the retarding torque force of seal 16. Therefore, since the torque effect of the seal 18 is equal to and opposite the effect of the torque of seal 16 on the rotating member 12, the present invention compensates for the effect of the seal 16. Thus, the measuring means 22 will measure only the shear effect of the rotating member 12 with reference to the fluid in the container 26 which will be a measurement of the viscosity of the fluid. In addition, since both seal 16 and seal 18 will be subjected to the same operating temperatures, pressures and wear, even as the operating conditions change, the torque force that seal 18 exerts on the member 12 will be equal and opposite to the torque force exerted by seal 16 under varying operating conditions thereby compensating for the effect of the seal 16 and allowing an accurate measurement of viscosity to be made.

In use, the apparatus 10 is operated by rotatably driving the rotatable member 12 in contact with the fluid in the container 26 by the constant speed motor 32. Thus, the motor 32 will operate to rotate the rod 28, the member 12 and the rod 44, all in the same direction and at the same speed. However, in order to compensate for the retarding torque force of the seal 16 on the rod 28, the seal 18 is rotated in the same direction, but at twice the speed of operation of the motor 32. Thus, motor 52 is operated at twice the speed of motor 32 and in turn rotates the carriage 46 which carries the seal 18 thereby creating a torque force through the rod 44, member 12 and rod 28 which is equal to the retarding effect of the seal 16, but is in the opposite direction thereby compensating for the effect of the seal 16. Thus, the measuring circuit 22 will then measure the torque which is applied to rod 28 which will depend solely upon the viscosity of the rotating member 12 in contact with the fluid container 26. That is, the movement of the arm 36 against the spring 40 will move the potentiometer 38 causing a change in the reading of the indicating instrument 42 which may be calibrated to read directly the viscosity of the fluid being measured.

It is believed that the method of the invention is apparent from the foregoing description of a presently preferred embodiment of the apparatus of the invention. The method, however, provides for measuring viscosity of a fluid by a rotating member in a container through a seal and includes the steps of rotatably driving the member through the seal, measuring the force required to drive the member, and applying a rotating force to the member substantially equal but opposite to the torque loss due to the seal whereby the force required to drive such member is an indication only of the viscosity of the fluid in contact with the rotating member. The method further comprehends the measurement of viscosity of a fluid by rotating a member in a container through a seal by rotatably driving the member through a first seal at a constant speed, placing a second seal identical to the first seal in position to be subjected to the same fluid contact as the first seal, rotatably driving the second seal in the same direction but at twice the speed of said member and against the member, and measuring the force required to drive the member thereby providing an indication of the viscosity of the fluid.

The present invention, therefore, is well-suited to carry out the objects and attain the ends and advantages mentioned as well as others inherent therein. While a presently preferred embodiment of the invention is given for the purpose of disclosure, numerous changes in the details of construction, arrangement of parts, and steps of the process may be made which will readily suggest themselves to those skilled in the art and which are accomplished within the spirit of the invention and the scope of the appended claims.

What is claimed is:

1. An apparatus for measuring viscosity of a fluid in a container comprising,
   a rotatable member positioned in said container for contact with said fluid,
   two rotatable rods connected to said member, and at least one of said rods extending out of said container,
   a first seal engaging said one rod,
   a second seal engaging said second rod, said seals being substantially identical,
   first drive means connected to said one rod for rotating said one rod and said member,
   a rotatable carriage supporting said second seal, and
   second drive means connected to said carriage for rotating said carriage and second seal, and
   measuring means measuring the driving force applied to said one rod.

2. An apparatus for measuring viscosity of a fluid in a container comprising,
   a rotatable member positioned in said container for contact with said fluid,
   a first rotatable rod connected to said member and extending through said container,
   first seal means positioned about said rod,
   first drive means connected to said first rod for rotating said first rod and said member,
   measuring means measuring the torque applied to said first rod by said first drive means,
   a second rod connected to said member,
   a second seal means positioned about said second rod, said second seal being substantially identical to the first seal,
   a rotatable carriage supporting said second seal means, and
   a second drive means connected to said carriage for rotating said carriage and said second seal means.

3. An apparatus for measuring viscosity of a fluid in a container comprising,
   a rotatable member positioned in said container for contact with said fluid in the container, a first rotatable rod connected to said member and extending through said container, a first seal means positioned about the first rod sealing fluid flow from said container around said first rod, a first constant speed drive means connected to said first rod for rotating said first rod and thus rotating said member in the fluid, a second rod connected to said member and extending through said container, a second seal means substantially identical to said first seal means, said second seal means positioned about the second rod for sealing fluid flow from said container around said second rod, a rotatable carriage supporting said second seal means and sealingly engaging said container, and a second constant speed drive means connected to said carriage for rotating said carriage and said second seal in the same direction, but at twice the speed as said member, and measuring means measuring the rotative force applied to said first rod by said first drive means.

References Cited by the Examiner

UNITED STATES PATENTS

| | | | |
|---|---|---|---|
| 3,131,568 | 5/1964 | Garwood | 308—183 X |
| 3,167,958 | 2/1965 | Hollmann | 73—231 |

DAVID SCHONBERG, *Primary Examiner.*